(12) United States Patent
Siegwart

(10) Patent No.: US 7,478,258 B2
(45) Date of Patent: Jan. 13, 2009

(54) IDENTIFYING A PROCESSOR IN A MULTIPROCESSOR SYSTEM

(75) Inventor: David Kevin Siegwart, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 11/316,656

(22) Filed: Dec. 22, 2005

(65) Prior Publication Data

US 2006/0161699 A1    Jul. 20, 2006

(30) Foreign Application Priority Data

Dec. 24, 2004 (GB) ................................. 0428364.4

(51) Int. Cl.
*G06F 1/14* (2006.01)
(52) U.S. Cl. ...................................................... 713/500
(58) Field of Classification Search .................. 713/500
See application file for complete search history.

(56) References Cited

U.S. PATENT DOCUMENTS 5,471,631 A * 11/1995 Beardsley et al. ............ 713/502
6,185,216 B1 * 2/2001 Chapman .................... 370/402
6,957,358 B1 * 10/2005 Sundaresan et al. ......... 713/600

* cited by examiner

*Primary Examiner*—Rehana Perveen
*Assistant Examiner*—Eric Chang
(74) *Attorney, Agent, or Firm*—Martin J. McKinley; Law Office of Jim Boice

(57) ABSTRACT

A method for storing an identity of a processor in a multiprocessor computer system, the processor including a high frequency clock having a clock value represented as a set of binary digits, the method comprising encoding an identifier of the processor in a subset of the set of binary digits. It is therefore possible to retrieve a value of a time represented by a high frequency clock in a processor and an identification of the corresponding processor in a single indivisible operation by encoding the processor identifier in the clock value.

1 Claim, 3 Drawing Sheets

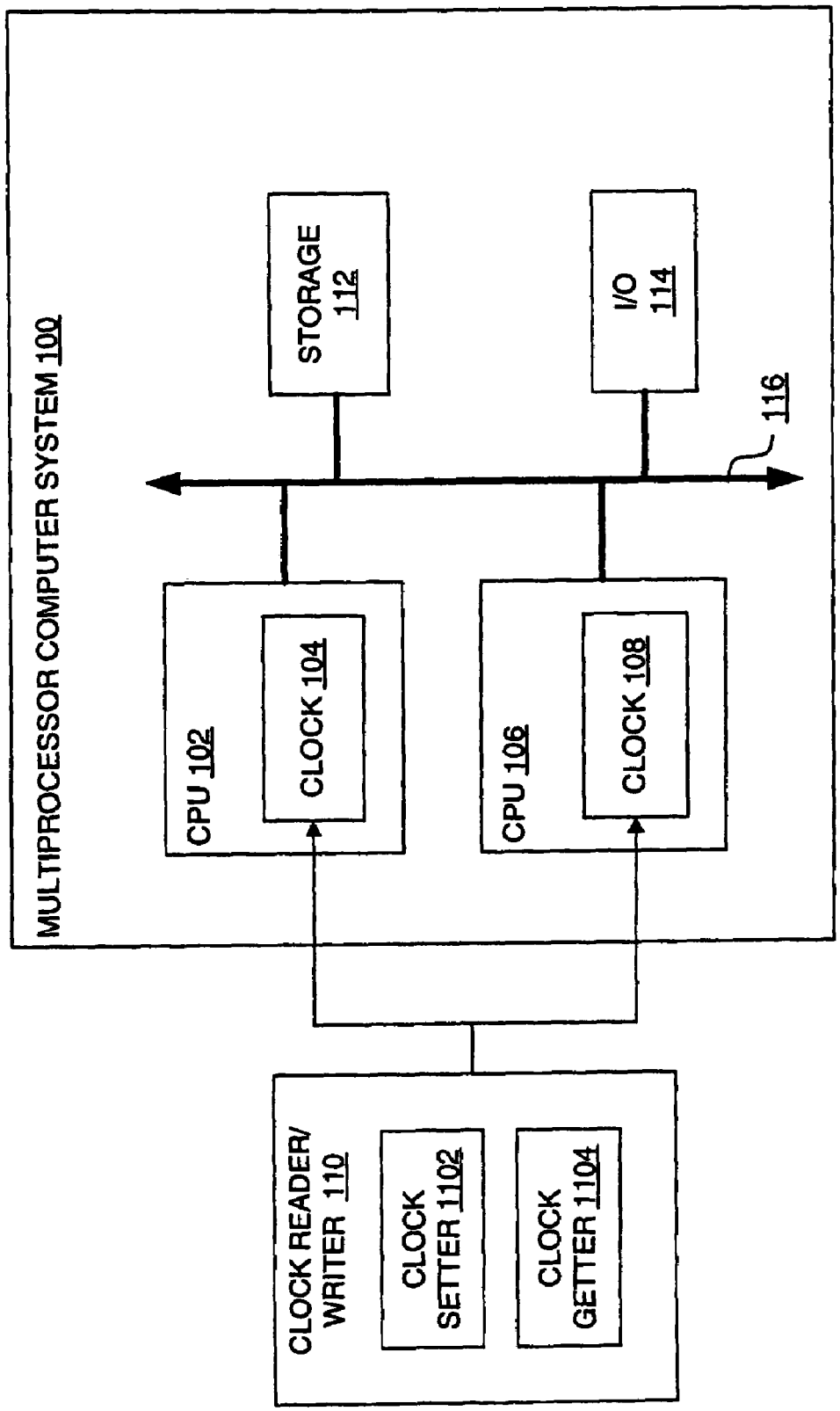

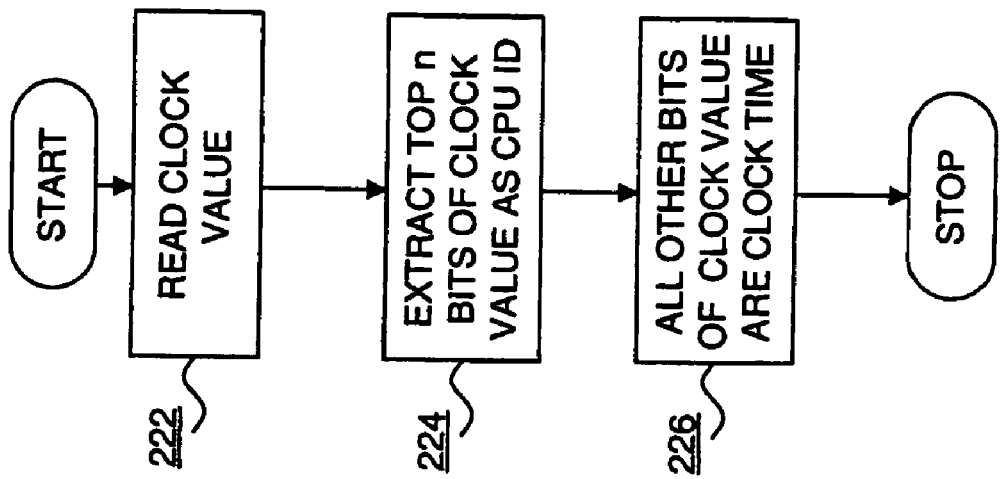
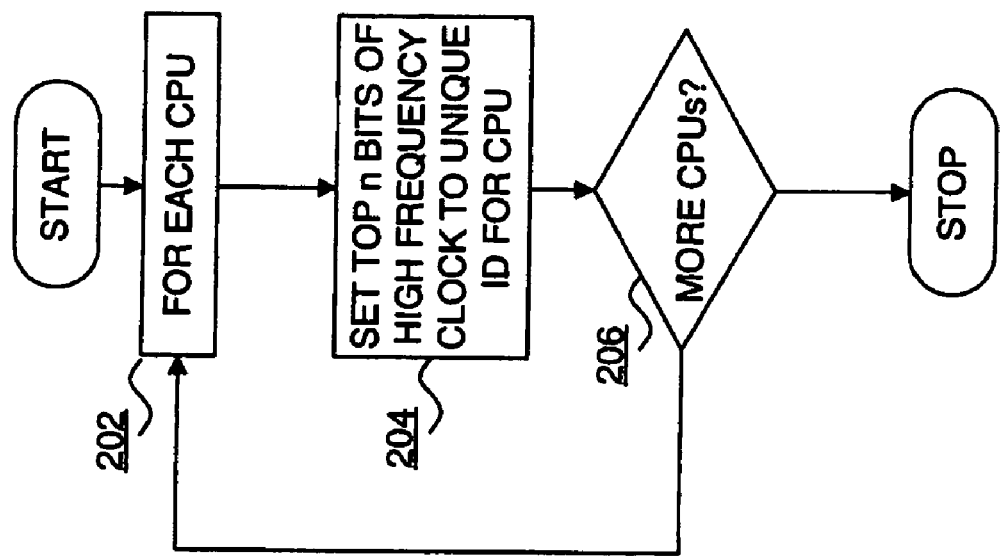

IDENTIFYING A PROCESSOR IN A MULTIPROCESSOR SYSTEM

BACKGROUND OF THE INVENTION

The present invention relates to identifying a processor in a multiprocessor system. In particular it relates to identifying a processor and a value of a high frequency clock of the processor in a single indivisible operation.

A computer central processing unit (CPU) may include a high frequency clock. For example, such a high frequency clock can define a step in a fetch, decode and execute cycle for the processor. Such clocks are to be distinguished from other system clocks which provide date and time facilities for a computer system since high frequency clocks are updated at a relatively high frequency. The precise frequency of such a high frequency clock is dependent upon the operational clock speed of a particular processor. By way of example, a processor configured to operate at a clock speed above one gigahertz will include a high frequency clock capable of providing a timing resolution of the order of magnitude of a nanosecond. This compares with a system clock which may provide a resolution of a thousandth or less of such high frequency clocks.

High frequency clocks in CPUs can have many applications. For example, such clocks are useful for the precise measurement of elapsed time and therefore have useful applications in the measurement of performance statistics for computer programs executing in a processor. The high resolution of the clock allows the measurement of elapsed time for very short program fragments, such as fragments requiring only a few hundred processor cycles. A typical approach to such a measurement is illustrated in pseudo-code below:

start_time=getHighFrequencyClockTicks
    <program fragment>
    end_time=getHighFrequencyClockTicks
    elapsed_time=end_time−start_time The <program fragment> above is the program fragment for measurement.

The pseudo-code "getHighFrequencyClockTicks* corresponds to processor instructions to obtain a value of the high frequency clock and is typically implemented as a few instructions in order to avoid consuming a significant amount of processor time. For example, in the Intel IA32 processor, getHighFrequencyClockTicks" corresponds to the RDTSC (read time stamp counter) instruction.

Whilst the use of such high frequency clocks is advantageous for measuring elapsed time on a single processor, in a multiprocessor system problems can arise because it is not possible to guarantee that the clocks in each processor are synchronized in the sense that they express an identical clock time. The difference between a value of one processor clock and a value of another processor clock is termed clock skew. This characteristic of multiprocessor systems coupled with a possibility that a running program fragment can be switched between processors during execution makes it very difficult to accurately measure an elapsed time for a program. This arises because the start_time and end_time may be measured on different clocks in different CPUs. For example, the start_time may be measured on a clock in a processor on which the program fragment commenced execution, and the end_time may be measured on a clock in a processor on which the program fragment ceased execution. In this situation the elapsed time includes not only the time taken to execute the program fragment, but also the unwanted clock skew.

One solution to this problem is to identify the processor on which the program fragment commences execution and to identify the processor on which the program fragment ceased execution. In this way it is possible to determine when the elapsed time measurement is based on clock values for the same processor. For example, the pseudo-code could be amended to:

start_processor=getProcessorID
    start_time=getHighFrequencyClockTicks
    <program fragment>
    end_time=getHighFrequencyClockTicks
    end_processor=getProcessorID
    elapsed_time=end_time−start_time
    if start_processor=end_processor then elapsed_time is valid Instructions are known for obtain an identifier for a processor (nominally indicated as "getProcessorID"). However, such instructions are typically synchronising instructions which interfere with the measurement of time. Further, it is possible that the performance measurement program is switched to a different processor between the "getProcessorID" instruction and the "getHighFrequencyClockTicks" instruction. Consequently, the "getHighFrequencyClockTicks" instruction will obtain a clock value for a processor which is different to the processor identified by the "getProcessorID" instruction.

SUMMARY OF THE INVENTION

The present invention accordingly provides, in a first aspect, a method for storing an identity of a processor in a multiprocessor computer system, the processor including a high frequency clock having a clock value represented as a set of binary digits, the method comprising encoding an identifier of the processor in a subset of the set of binary digits. Thus, in this way it is possible to retrieve a value of a time represented by a high frequency clock in a processor and an identification of the corresponding processor in a single indivisible operation by encoding the processor identifier in the clock value. There is therefore no opportunity for the reading of the value of the clock or the identification of the processor to be accompanied by an intervening step—such as a redispatch operation causing a change of processor. This guarantees that a value of time read from a clock corresponds to the same CPU as is identified by the CPU identifier.

The present invention accordingly provides, in a second aspect, a method for identifying a processor in a multiprocessor computer system, the processor including a high frequency clock having a clock value represented as a set of binary digits, the method comprising extracting a subset of the set of binary digits as an identifier of the processor.

The present invention accordingly provides, in a third aspect, an apparatus for storing an identity of a processor in a multiprocessor computer system, the processor including a high frequency clock having a clock value represented as a set of binary digits, the apparatus comprising means for encoding an identifier of the processor in a subset of the set of binary digits.

The present invention accordingly provides, in a fourth aspect, an apparatus for identifying a processor in a multiprocessor computer system, the processor including a high frequency clock having a clock value represented as a set of binary digits, the apparatus comprising means for extracting a subset of the set of binary digits as an identifier of the processor.

The present invention accordingly provides, in a fifth aspect, computer program products comprising computer program code stored on a computer readable storage medium which, when executed on a data processing system, instructs the data processing system to carry out the methods described above.

BRIEF DESCRIPTION OF THE DRAWINGS

A preferred embodiment of the present invention will now be described, by way of example only, with reference to the accompanying drawings, in which:

FIG. 1 is a block diagram of a multiprocessor computer system (MPC) including two CPUs in accordance with a preferred embodiment of the present invention; and FIG. 2a is a flowchart illustrating a method for encoding CPU identifiers in a corresponding high frequency CPU clock in accordance with a preferred embodiment of the present invention;

FIG. 2b is a flowchart illustrating a method for decoding a CPU identifier and a clock value from a high frequency CPU clock in accordance with a preferred embodiment of the present invention.

DETAILED DESCRIPTION OF THE PREFERRED EMBODIMENT

Figure 3:
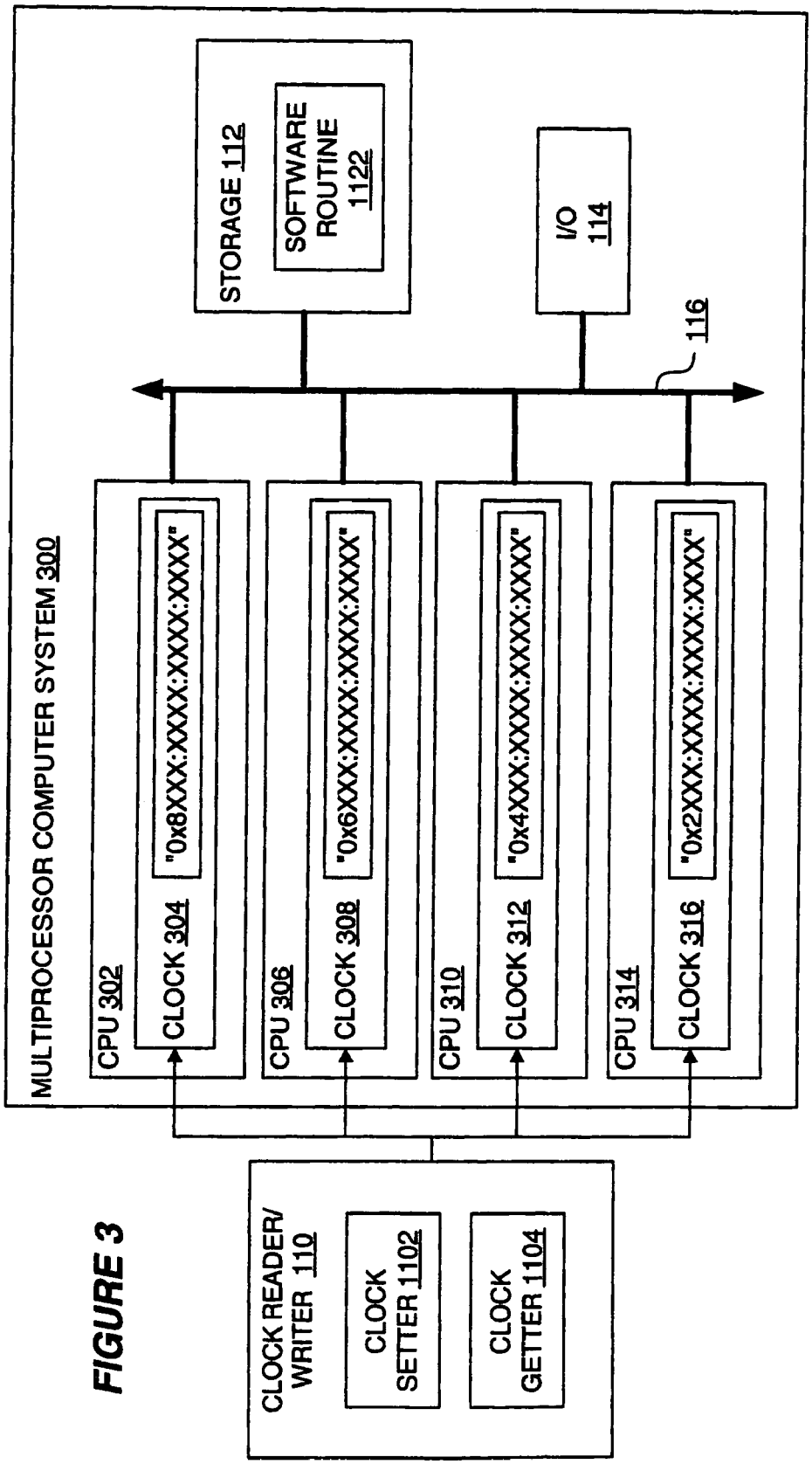
FIG. 3 is a block diagram of a multiprocessor computer system (MPC) including four CPUs in accordance with a preferred embodiment of the present invention.

FIG. 1 is a block diagram of a multiprocessor computer system (MPC) 100 including two CPUs 102 and 106 in accordance with a preferred embodiment of the present invention. Each of the CPUs 102 and 106 includes a clock 104 and 108. Clocks 104 and 108 are high frequency clocks internal to the CPUs. For example, the CPUs 102 and 106 are Intel IA32 CPUs such as Intel Pentium and the clocks 104 and 108 are sixty-four bit unsigned clock values updated regularly, such as every nanosecond. The MPC 100 further includes storage 112 which can be any read/write storage device such as a random access memory (RAM) or a non-volatile storage device. An example of a non-volatile storage device includes a disk or tape storage device. The MPC 100 also includes an input/output (I/O) interface 114 which is an interface to devices for the input or output of data, or for both input and output of data. Examples of I/O devices connectable to I/O interface 114 include a keyboard, a mouse, a display (such as a monitor) and a network connection. The CPUs 102 and 106 are communicatively connected to storage 112 and I/O interface 114 via a data bus 116.

FIG. 1 further includes a clock reader/writer 110. The clock reader/writer 110 is a hardware or software component capable of reading values of the clocks 104 and 106 and writing values to the clocks 104 and 106. The clock reader/writer 110 further includes a clock setter 1102 and a clock getter 1104. The clock setter 1102 is a software or hardware component for setting a value of each of the clocks 104 and 108. For example, the clock setter 1102 can use a CPU instruction of each of the CPUs 102 and 106 to set a value of each of the corresponding clocks 104 and 108. Similarly, the clock getter 1104 is a software or hardware component for retrieving a value of each of the clocks 104 and 108. For example, the clock getter 1104 can use a CPU instruction of each of the CPUs 102 and 106 to retrieve a value of the corresponding clocks 104 and 108. Such an instruction is the RDTSC (read time stamp counter) instruction on the Intel IA32 CPU architecture.

In use, the MPC 100 executes software routines including operating system software and application software in one or both of the CPUs 102 and 106. Software routines are stored in storage 112 and transferred between the storage 112 and the CPUs 102 and 106 via the data bus 116. Rules of operation regarding the use of the CPUs 102 and 106 (such as which software routines run on which CPU) are decided by operating logic (not shown) of the MPC 100 such as a software operating system or a firmware operating subsystem, as is well known in the art. At runtime, the clock setter 1102 sets a value of clock 104 such that the value of clock 104 includes an encoded indicator which identifies the CPU 102 containing clock 104. Similarly, the clock setter 1102 sets a value of clock 108 such that the value of clock 108 includes an encoded indicator which identifies the CPU 106 containing clock 108. A method for encoding CPU identifiers in a corresponding high frequency CPU clock is considered in detail below with respect to FIG. 2a.

Further, at runtime the clock getter 1104 retrieves a value of clock 104 and extracts an encoded CPU identifier. The extracted CPU identifier corresponds to the CPU 102 containing the clock 104. Similarly, at runtime the clock getter 1104 retrieves a value of clock 108 and extracts an encoded CPU identifier. The extracted CPU identifier corresponds to the CPU 106 containing the clock 108. A method for decoding a CPU identifier and a clock value from a high frequency CPU clock is considered in detail below with respect to FIG. 2b FIG. 2a is a flowchart illustrating a method for encoding CPU identifiers in a corresponding high frequency CPU clock in accordance with a preferred embodiment of the present invention. At step 202 a loop is initiated through each CPU in MPC 100. At step 204, for a current CPU in the MPC 100, a set of bits of a high frequency clock associated with the current CPU is set to a value uniquely identifying the CPU. Preferably the set of bits is a most significant set of bits, such as a first three bits in a sixty four bit clock field. Subsequently, at step 206, the method determines if the MPC 100 includes more CPUs and loops to step 202 accordingly.

FIG. 2b is a flowchart illustrating a method for decoding a CPU identifier and a clock value from a high frequency CPU clock 104, 108 in accordance with a preferred embodiment of the present invention. At step 222, a value of the clock is read using the clock getter 1104. At step 224 a set of bits of the clock which include a value uniquely identifying a CPU containing the clock are read. For example, a CPU identifier bit mask which is a binary mask including a single bit for each bit of the clock value can be used to extract the CPU identifier from the clock value. The mask has binary values of '1' for bits included in the set of bits having the CPU identifier and binary values of '0' for all other bits. Applying the mask to the clock value using a logical AND operation results in the extraction of only the bits of the clock value for which a corresponding mask bit is set to the value '1'. Subsequently at step 226 the remaining bits of the clock value (i.e. Those bits not forming part of the CPU identifier) are extracted and correspond to a time represented by the clock. These remaining bits can be extracted using a further mask which is the inverse of the CPU identifier mask described above.

FIG. 3 is a block diagram of a MPC 300 including four CPUs 302, 306, 310 and 314 in accordance with a preferred embodiment of the present invention. The arrangement of FIG. 3 will be used to demonstrate a preferred embodiment of the invention in use. Many of the elements of FIG. 3 are identical to those described with respect to FIG. 1 and these will not be repeated here. FIG. 3 further includes a software routine 1122 which is a set of software instructions such as machine instructions stored in the storage 112 of the MPC 300. The software routine 1122 is executable in any of the four CPUs 302, 306, 310 or 314 of MPC 300.

Each of the CPUs 302, 306, 310 and 314 includes a clock 304, 308, 312 and 316 respectively. Each of the clocks of includes a sixty-four bit clock value represented in FIG. 3 in hexadecimal notation (this is indicated by a preceding "0x" for each clock value). For example, clock 304 is illustrated as having a clock value of "0x8XXX:XXXX:XXXX:XXXX". The capitalised "X" character is used to indicate some value of the time of the clock 304 which is of no particular significance to this description, and the colons are used to improve the readability of the hexadecimal numeral. The other clocks 308, 312 and 316 include similar values respectively. Each of the clocks of FIG. 3 are arranged such that their values have been set by the clock setter 1102. The clock setter 1102 has set the values of each clock such that the most significant three bits of each clock corresponds to a CPU identifier. The most significant three bits is represented by an even value of the first hexadecimal digit in each clock value. Thus, for clock 304 with a value of "0xSXXXrXXXXrXXXXrXXXX" the first three bits of the clock value is '0x8". Thus the hexadecimal number "0x8" identifies CPU 302. Similarly, clock 306 has a value of "'0x6XXX:XXXX:XXXX:XXXX" with the first three bits of the clock value being "0x6". Thus the hexadecimal number "0x6" identifies CPU 306, and so on for clocks 310 and 314.

A preferred embodiment of the present invention will now be considered in use for the arrangement of MPC 300 of FIG. 3 and for two scenarios detailed below where the following pseudo-code is executed:

A) start_clock_val=getClockValue for current CPU
B) execute software routine 1122
C) end_clock_val=getClockValue for current CPU The "getClockValue" at steps A and C for the current CPU corresponds to the function of the clock getter 1104 which obtains a value of a high frequency clock from a current CPU. The current CPU is a CPU on which the pseudo-code us considered to be executing at a point in time.

In a first scenario the pseudo-code will be considered in which the pseudo-code commences execution of step A on CPU 314 but is redispatched during the execution of software routine 1122 (step B) to CPU 306. Consequently, in the first scenario the pseudo-code completes execution of step C on CPU 306. Considering now the pseudo-code in detail for the first scenario, at step A the current CPU is 314 and the start_clock_val is therefore obtained to be a value of the clock 316, which is >>0x2XXX:XXXX:XXXX:XXXX". Subsequently, at step B the software routine 1122 is executed and the pseudo-code is also redispatched to CPU 306.

Subsequently at step C the current CPU is 306 and the end_clock_val is therefore obtained to be a value of the clock 308, which is "0x6XXX:XXXX:XXXX:XXXX". Thus, using the method of FIG. 2b it is possible to use the values of start_clock_val and end_clock_val to identify the CPU and the clock time value both before and after the execution of the software routine 1122. Considering first the start_clock_val of the first scenario using the method of FIG. 2b, at step 222 the value has been read as *0x2XXX:XXXX:XXXX: XXXX" (see step A above). At step 224 the top three bits of the clock value is read as the CPU ID. This can be achieved using a mask corresponding to the top three bits of the clock value and a logical AND operation. Such a mask has the value of *0xE000:0000:0000:0000" and can be used to extract the top three bits of the start_clock_val as follows:

start_clock_val AND mask=CPU ID
>>0x2XXX:XXXX:XXXX:XXXX" AND *0xE0OO: 0000:0000:0000"='0x2000:0000:0000:0000*

Thus, the CPU ID for the start_clock_val is determined to be "2* (excluding all other bits of the clock value). Subsequently, at step 226, the clock time can be read as the value of all other bits of the clock value. This can be achieved using a mask in the same way, but the mask would be *0x1FFF:FFFF: FFFF:FFFF* in order to extract all other bits.

Similarly, considering the end_clock_val of the first scenario using the method of FIG. 2b, at step 222 the value has been read as *0x6XXX:XXXX:XXXX:XXXX* (see step C above). At step 224 the top three bits of the clock value is read as the CPU ID. This can be achieved using a mask corresponding to the top three bits of the clock value as above.

end_clock_val AND mask=CPU ID
<<0x6XXX:XXXX:XXXX:XXXX* AND <<0xE000: 0000:0000:0000"=>>0x6000:0000:0000:0000"

Thus, the CPU ID for the start_clock_val is determined to be "6" (excluding all other bits of the clock value). Subsequently, at step 226, the clock time can be read as the value of all other bits of the clock value using a mask of "0x1FFF: FFFF:FFFF:FFFF".

Accordingly, it can be determined that the start_clock_val includes an indication that the pseudo-code for the first scenario commenced on a CPU with an ID of "2", and completed on a CPU with an ID of "6*. In the first scenario it is therefore possible to identify that the software routine 1122 was redispatched during execution from an analysis of the clock values alone.

The pseudo-code will now be considered in use by way of example only for a second scenario in which the pseudo-code commences execution on CPU 310 and is not redispatched. Consequently, in the second scenario the pseudo-code completes execution on CPU 310. In a second scenario the pseudo-code will be considered in which the pseudo-code commences execution of step A on CPU 310 and is not redispatched during the execution of software routine 1122 (step B). Consequently, in the second scenario the pseudo-code completes execution of step C on CPU 310. Considering now the pseudo-code in detail for the first scenario, at step A the current CPU is 310 and the start_clock_val is therefore obtained to be a value of the clock 312, which is *0x4XXX: XXXX:XXXX:XXXX". Subsequently, at step B the software routine 1122 is executed without redispatch. Subsequently at step C the end_clock_val is obtained to be a value of the clock 312, which is *0x4XXX:XXXX:XXXX: XXXX". Thus, using the method of FIG. 2b it is possible to use the values of start_clock_val and end_clock_val to identify the CPU and the clock time value both before and after the execution of the software routine 1122.

Considering first the start_clock_val of the second scenario using the method of FIG. 2b, at step 222 the value has been read as *0x4XXX:XXXX:XXXX:XXXX" (see step C above). At step 224 the top three bits of the clock value is read as the CPU ID. This is achieved using a mask corresponding to the top three bits as for the first scenario above and as follows:

start_clock_val AND mask=CPU ID
"0x4XXX:XXXX:XXXX:XXXX* AND >>OxEOOO: 0000:0000:0000"="0x4000:0000:0000:0000"

Thus, the CPU ID for the start_clock_val is determined to be M" (excluding all other bits of the clock value). Subsequently, at step 226, the clock time can be read as the value of all other bits of the clock value. This can be achieved using the mask as described above with respect to the first scenario.

Similarly, considering the end_clock_val of the second scenario using the method of FIG. 2b, at step 222 the value has been read as *0x4XXX:XXXX:XXXX:XXXX" (see step A above). At step 224 the top three bits of the clock value is read as the CPU ID. This can be achieved using a mask corresponding to the top three bits of the clock value as above.

end_clock_val AND mask=CPU ID
<<0x4XXX:XXXX:XXXX:XXXX* AND
<<0xE000:0000:0000:0000"=<<0x4000:0000:0000:
0000"

Thus, the CPU ID for the start_clock_val is determined to be "4" (excluding all other bits of the clock value). Subsequently, at step 226, the clock time can be read as the value of all other bits of the clock value using the mask as described above with respect to the first scenario.

Accordingly it can be determined that the start_clock_val includes an indication that the pseudo-code for the second scenario commenced on a CPU with an ID of "4", and completed on a CPU with an ID of M". In the second scenario it is therefore possible to identify that the software routine 1122 commenced and completed execution on the same CPU.

Thus, in this way it is possible to retrieve a value of a time represented by a high frequency clock in a processor and an identification of the corresponding processor in a single indivisible operation by encoding the processor identifier in the clock value. There is therefore no opportunity for the reading of the value of the clock or the identification of the processor to be accompanied by an intervening step—such as a redispatch operation causing a change of processor. This guarantees that a value of time read from a clock corresponds to the same CPU as is identified by the CPU identifier.

It is theoretically possible that the time encoded in the lower bits (as denoted by the character *X") will at some time overflow into the upper three bits of the clock value. This can corrupt the CPU identifier encoded in the upper three bits making its value meaningless. To prevent this happening, the time encoded in these lower bits can not be initially set to high values, and in particular can be set to zero, at the same time as the CPU id is encoded. For a nano-second timer, the time interval measurable by such a clock is in the region of $2^{61}$ ns=73 years, so for all practical purposes such corruption should not happen. Whilst this time interval is dependent upon the frequency of update of the clock (i.e. the frequency of incrementation of the clock), as clock frequencies increase so does the number of bits for the storage of values of such clocks.

The invention claimed is:
1. A method for identifying a location of software execution in a multiprocessor computer system, wherein each processor in the multiprocessor computer system includes a different high frequency clock having a clock value represented as a set of binary digits, the method comprising:
   initiating execution of a software routine in a first processor;
   setting, by a clock setter at an initiation of a runtime of a software routine, a first value of a first clock in the first processor in a multiprocessor computer system, wherein the first value of the first clock is represented by a first sixty-four bit unsigned clock value, wherein the first sixty-four bit unsigned clock value includes a first unique identifier for the first processor in a first leading set of three most significant bits in the first sixty-four bit unsigned clock value, wherein a first remainder of sixty-one bits of the first value is reserved for a first value of a first time that is set in the first processor when the software routine initiates execution in the first processor, and wherein identification of the first processor and identification of the first value of the first time is enabled to be performed in a first single indivisible operation that prohibits any first intervening step;
   redispatching the software routine from the first processor to the second processor:
   setting, by the clock setter at a conclusion of a runtime of the software routine, a second value of a second clock in the second processor in the multiprocessor computer system, wherein the second value of the second clock is represented by a second sixty-four bit unsigned clock value, wherein the second sixty-four bit unsigned clock value includes a second unique identifier for the second processor in a second leading set of three most significant bits in the second sixty-four bit unsigned clock value, wherein a second remainder of sixty-one bits of the second value is reserved for a second value of a second time that is set in the second processor when execution of the software routine is completed in the second processor, and wherein identification of the second processor and identification of the second value of the second time is enabled to be performed in a second single indivisible operation that prohibits any second intervening step;
   reading, by a clock getter, a start clock value from the first processor, wherein the start clock value is the first value of the first clock that is set by the clock setter when the software routine initiates execution in the first processor, wherein the start clock value describes both the first unique identifier of the first processor and a start time for initiating execution of the software routine in the first processor; and
   reading, by the clock getter, an end clock value from the second processor, wherein the end clock value is the second value of the second clock that is set by the clock setter when the execution of the software routine completes executing in the second processor, wherein the end clock value describes both the second unique identifier of the second processor and an ending time for completing execution of the software routine in the second processor, wherein the first clock value and the second clock value identify a starting processor and a finishing processor that are both used to execute the software routine.

* * * * *